United States Patent [19]

Lundqvist

[11] Patent Number: 5,155,138
[45] Date of Patent: Oct. 13, 1992

[54] EXPANDABLE THERMOPLASTIC MICROSPHERES AND PROCESS FOR THE PRODUCTION AND USE THEREOF

[75] Inventor: Jörgen Lundqvist, Kvissleby, Sweden

[73] Assignee: Casco Nobel AB, Stockholm, Sweden

[21] Appl. No.: 789,323

[22] Filed: Nov. 8, 1991

[30] Foreign Application Priority Data

Nov. 12, 1990 [SE] Sweden .............................. 9003600

[51] Int. Cl.⁵ .......................... C08K 9/10; B01J 13/14; B01J 13/18
[52] U.S. Cl. ........................................ 521/76; 521/59; 521/135; 521/139; 521/140; 521/145; 521/146; 521/147; 521/149; 523/210; 524/827; 524/834
[58] Field of Search .................. 521/56, 59, 76, 135, 521/139, 140; 523/210; 524/827, 834

[56] References Cited

U.S. PATENT DOCUMENTS 3,615,972  10/1971  Morehouse, Jr. et al. ......... 521/146
3,821,128   6/1974  Garner .................................. 521/56

FOREIGN PATENT DOCUMENTS 2277543  11/1990  Japan .

Primary Examiner—Morton Foelak
Attorney, Agent, or Firm—Burns, Doane, Swecker & Mathis

[57] ABSTRACT

A method for producing expandable thermoplastic microspheres by polymerisation in a reaction vessel of an ethylenically unsaturated monomer or a mixture of monomers in an aqueous suspension in the presence of a condensed propellant. In the method, the monomer or monomer mixture is suspended in the aqueous medium in the presence of a powder stabilizer which consists of a salt or hydroxide of any of the metals Ca, Mg, Ba, Fe, Zn, Ni or Mn. The powder stabilizer is insoluble in the aqueous medium at the pH the aqueous medium has at the polymerisation. The aqueous medium has at the polymerization. The aqueous medium may also contain a co-stabilizer. The method further comprises the step of washing off the powder stabilizer from the microspheres after the polymerization by lowering the pH of the aqueous medium by the addition of acid. Alternatively, amphoteric hydroxides can also be dissolved by a pH increase. The invention also relates to microspheres produced according to the method of the invention, and to the use thereof.

10 Claims, No Drawings

EXPANDABLE THERMOPLASTIC MICROSPHERES AND PROCESS FOR THE PRODUCTION AND USE THEREOF

The present invention relates to a new type of expandable thermoplastic microspheres and to a method for producing and using such microspheres. More specifically, the invention relates to thermoplastic microspheres produced with powder stabilisers of a type not hitherto used in this field, which either remain on the surface of the finished microspheres or are conveniently removed from the surface of the spheres.

Expandable thermoplastic microspheres have been commercially produced over several years and have always found new and extended fields of application. There are many patents on the production and use of microspheres.

Thermoplastic microspheres are produced largely in accordance with a method described in U.S. Pat. No. 3,615,972. The microspheres are produced by suspension polymerisation where a liquid monomer or monomer mixture containing condensed propellant is dispersed in an aqueous medium containing suspending agent and polymerisation catalyst. The resulting microspheres consist of a polymer shell containing the liquid, volatile propellant. The spheres expand by heating to a temperature above the boiling point of the propellant and the softening point of the polymer. The thermoplastic shell of the spheres may consist of polymers or copolymers of e.g. vinyl chloride, vinylidene chloride, acrylonitrile, methyl methacrylate or styrene or mixtures thereof. The particle size of the unexpanded spheres and, hence, of the expanded ones may vary within wide limits and is selected on the basis of the desired properties of the finished product. The particle size of unexpanded spheres may, for example, be 1 $\mu$m to 1 mm, preferably 2 $\mu$m to 0.5 mm and particularly 5 $\mu$m to 50 $\mu$m. Upon expansion, the diameter of the microspheres increases by a factor 2 to 5. The propellant may be freons, such as trichlorofluoromethane, hydrocarbons, such as n-pentane, iso-pentane, neopentane, butane, iso-butane or other conventional propellants. The propellant suitably makes up 5-30% by weight of the microsphere. One example of a suitable, commercially available microsphere product is Expancel ® which has a thermoplastic shell of a vinylidene chloride/acrylonitrile copolymer and contains isobutane as propellant.

In conventional production of microspheres according to U.S. Pat. No. 3,615,972, the polymerisable monomer or monomer mixture and the initiator and propellant are suspended in an aqueous medium containing suspending agent in a reaction vessel. The suspending agent consists of a solid colloid which is insoluble in the aqueous medium. Optionally, costabilisers are also used for acting on the hydrophilic hydrophobic balance in the system. After polymerisation, the aqueous medium is removed, e.g. by sedimentation, centrifugation or filtering, or any other suitable method. The insoluble colloid used as suspending agent remains on the surface of the microspheres. U.S. Pat. No. 3,615,972 proposes a number of different materials and compounds as conceivable suspending agents. However, colloidal silicic acid is used in all the embodiments described. This is also the predominant suspending agent in this technical field.

Known microspheres however suffer from a number of drawbacks. It has been found that the finished microspheres are difficult to dewater, i.e. it is difficult to remove the aqueous medium and also to dry the microspheres. It has also been found that the known spheres may be difficult to disperse in different media, such as polymer binders.

As recited in the accompanying claims, the present invention is directed to microspheres and a method of producing them by means of which the above-mentioned problems are overcome and additional advantages are gained as compared with known microspheres.

It has surprisingly been found that the use of certain types of powder stabilisers as suspending agent yields microspheres having improved properties in many respects. The powder stabilisers used according to the invention consist of salts or hydroxides of any of the metals Ca, Mg, Ba, Fe, Zn, Ni and Mn. Examples of stabilisers which can be used according to the invention are calcium phosphate, magnesium hydroxide, barium sulphate, calcium oxalate, the hydroxides of iron, zinc, nickel and manganese.

By using the powder stabilisers according to the present invention, microspheres are obtained having a completely different surface structure as compared with known microspheres. The improved surface structure can be seen in a microscope as a more even surface compared with that of known spheres. The altered surface structure is the reason why so many properties of the microspheres are improved. Thus, the new microspheres have very low water absorption, which means they are easier to dewater and easier to dry than conventional spheres. Besides, the spheres have higher dispersibility in a binder, such as PVC plastisol, and also have higher adhesion to ambient polymer. The lower water retention results in paints and putty having a reduced tendency to crack formation when the spheres are used as filer therein.

The new microspheres also have improved expansion characteristics. It is possible to expand them at a lower and also at a higher temperature than conventional spheres. Thus, the spheres expand satisfactorily within a broader temperature range. The spheres are easy to expand, and a very low density can be obtained. The lower density means that a smaller amount of the new spheres is required as compared with known spheres to achieve a certain foaming height, e.g. on PVC plastisol. It has also been found that pigmented products will have a brighter colour together with the new spheres than with conventional microspheres. Another advantage is that the spheres according to the invention can be produced with a larger particle size without giving rise to the agglomeration problems usually encountered in conventional spheres.

A distinctive feature of the powder stabilisers used as suspending agent according to the invention is that they are insoluble in the aqueous medium at the pH this medium has at the polymerisation, but that the stabilisers are easily dissolved after polymerisation by lowering the pH by the addition of acid. Amphoteric hydroxides can also be dissolved by a pH increase. This provides the additional advantage that the powder stabiliser can be washed off in a simple and gentle manner from the surface of the microspheres, which yields microspheres with a completely clean polymer surface. The good properties stated above will be further enhanced in the washed microspheres.

One drawback of the colloidal silicic acid used according to conventional technique is that it is very difficult to remove from the microsphere surface. It is therefore not possible to obtain washed microspheres with this colloid. The polymerisation with the colloidal silicic acid takes place in acid environment for the aqueous medium. The polymerisation with the colloids according to the invention usually takes place in alkaline environment. Thus, for example, magnesium hydroxide is insoluble only at a pH of >about 8. The magnesium hydroxide is readily washed off after the polymerisation by lowering the pH in the medium to below 8. It was also surprising that powder stabilisers which are only insoluble at such high pH values could be used in the polymerisation of e.g. acrylonitrile monomer. According to known technique, acrolynitrile must be polymerised in an aqueous medium in acid environment, or else the monomer and the polymer formed will be ruined by hydrolysis. It was however found that also acrylonitrile could be polymerised excellently with the powder stabilisers according to the invention, e.g. with magnesium hydroxide at a pH of >8.

According to known technique, use is often made of so-called co-stabilisers together with the colloidal silicic acid. It may also be convenient to use co-stabilisers altogether with the colloids according to the invention, although this is not always called for. Examples of compounds which can be used as co-stabilisers are alkali compounds of alkyl sulphates, sulphonates, fatty acids and nonionic emulsifiers.

The powder stabilisers according to the invention can be used in suspension polymerisation in known manner with ethylenically unsaturated monomers or mixtures thereof which can form propellant-containing microspheres. Examples of usable monomers are acrylic esters, methacrylic esters, acrylonitrile, vinylidene chloride, styrene, butadiene etc. For example, the microspheres may be prepared from styrene and up to 40% by weight (based on the styrene) of copolymerised, ethylenically unsaturated monomers, especially acrylonitrile. Other suitable polymers are copolymers of vinylidene chloride and up to 40% by weight (based on the vinylidene chloride) of acrylonitrile or vinyl chloride. Preferred copolymers consist of 0-80% by weight of vinylidene chloride, 0-80% by weight of acrylonitrile and 0-70% by weight of methy methacrylate, and particularly preferred ones of 0-55% by weight of vinylidene chloride, 40-80% by weight of acrylonitrile and 0-50% by weight of methyl methacrylate. This enumeration should however not be considered restrictive, since the method according to the invention is applicable to all types of thermoplastic microspheres. A suitable particle size for the microspheres is in the range of 3-100 μm, preferably 5-50 μm.

It may sometimes be desirable that the shell of the microspheres consists of a crosslinked polymer. Common bifunctional monomers, such as divinylbenzene, ethylene glycol dimethylacrylate, triethylene glycol dimethacrylate, allyl methacrylate, triallyl isocyanate can be used as crosslinking agents.

The polymerisation is carried out by means of known initiators, such as dialkyl peroxides, diacyl peroxides, peroxy esters, peroxy dicarbonates and azo compounds.

The propellant used is of known type, e.g. isobutane, isopentane, isooctane, n-butane, pentane and petroleum ether.

The amounts of the different chemicals may vary within wide limits and are easily determined by a person skilled in the art. A guiding principle is that 1 part of monomer phase is dispersed in 1-8 parts of aqueous phase. The aqueous phase contains powder stabiliser in an amount of 1-20% of the monomer amount, preferably 3-12%, a particularly preferred amount being 4-8%. When a co-stabiliser is used, it is included in an amount of 0.001-1% of the monomer amount. The pH of the aqueous phase at the polymerisation depends on the powder stabiliser used. The pH of the aqueous phase must be selected such that the powder stabiliser is insoluble in the aqueous phase. The powder stabilisers according to the invention are preferably insoluble in alkaline environment. Preferably, the pH is in the range of 7-11. The suspension of the monomer phase in the aqueous medium is carried out in known manner, e.g. with the agitator of the reactor, to the desired droplet size, after which polymerisation takes place. The polymerisation temperature suitably is 30°-80° C., preferably 40°-70° C., an especially preferred temperature range being 50°-65° C. If completely clean microspheres are desirable, the powder stabiliser is dissolved after polymerisation by lowering the pH by the addition of acid. The extent to which the pH should be lowered to cause the powder stabiliser to dissolve depends on the salt used. For example, magnesium hydroxide already dissolves at pH 8.5, whereas other salts need lower pH values to dissolve. Suitably, pH is lowered to about 4-5. Common acids, such as acetic acid, hydrochloric acid or sulphuric acid, can be used.

After the polymerisation, the aqueous phase is removed, for instance by filtering. To produce completely dry spheres, the dewatered spheres are dried at a temperature below the expansion temperature.

The microspheres according to the invention can be expanded in known manner. A particularly suitable method for drying and expansion of the new microspheres is described in SE Patent Application No. 8900541-7.

The microspheres according to the invention can be used within all the fields of application of conventional microspheres, both in unexpanded and in expanded form. For example, they may be used as fillers in polymers, paints, putty, plastisols, printing inks, and also as fillers in paper, paperboard, explosives, cable insulations and for impregnating nonwoven.

The invention will now be described in more detail in the following Examples, which are however not to be considered restrictive of the invention. By parts and percentages as used in the Examples are meant parts by weight and per cent by weight, unless otherwise stated.

EXAMPLE 1

6.5 parts of $Mg(OH)_2$ as a 2.5% dispersion (precipitated from NaOH and $MgCl_2$ at pH 9.0-9.5) and 170 parts of water were charged into a 15-liter reactor equipped with an propeller. 0.01 parts of sodium lauryl sulphate and 1.0 parts of dicetyl peroxy dicarbonate were thereafter added. The reactor was sealed and evacuated at room temperature. To the reactor was then charged a mixture of 0.3 parts of divinylbenzene, 41.5 parts of methyl methacrylate, 58.5 parts of acrylonitrile and 21 parts of isobutane. The reaction mixture was stirred for 30 min to dissolve the initiator. The speed of rotation was thereafter increased to 800 rpm for 60 min to homogenise the liquid mixture to a suitable droplet size. After homogenisation, the speed of rotation was lowered to 400 rpm, whereupon the mixture was heated to 55° C. The mixture was polymerised for 8 h at 55° C. The polymerisate was filtered, washed and dried.

To remove the powder stabiliser from the resulting polymerisate, an addition of acid was made, for example of acetic acid, to pH 4–5. $Mg(OH)_2$ was readily hydrolised, and the resulting residual products were easily washed off.

EXAMPLE 2

The procedure according to Example 1 was repeated, however with the magnesium hydroxide replaced by 6.5 parts of $Ca_3(PO_4)_2$ which had been precipitated from a solution of sodium phosphate and calcium chloride at pH 8.5. Also this powder stabiliser was easily removed in the same way as in Example 1.

Wet unexpanded microspheres are normally supplied with a dry content of about 65% by weight, so-called wet cake. When dewatering the microsphere dispersion according to the present invention, the dry content increased to above 70% by weight with the same filtering time as for conventional microspheres. If instead the same moisture content, 65% by weight, is desired, the filtering time could be reduced by 20% for the spheres according to the invention as compared with conventional microspheres.

The dispersibility of microspheres in a binder was tested by adding 5% by weight of dry unexpanded microspheres to a black PVC plastisol. The microspheres were dispersed in the PVC plastisol with propeller-equipped agitators for 3 min. The mixture were spread on a paper by means of an adjustable film applicator, set at 380 μm gap height. The film was gelatinised in an oven for 40–60 sec at 160° C. The microspheres in the film expanded during the gelatinisation.

Undispersed microspheres will, when expanding, "crop up" as small white stars or snow flakes against the black background. Easily dispersed microspheres however produce a spotless black surface, whilst the presence of white spots indicate that the microspheres are difficult to disperse. The presence of spots can be judged according to a scale where 5 indicates a completely spotless film, while 1 indicates a large number of spots.

The microspheres according to the present invention yielded a completely spotless film, marks 4–5, whereas conventional microspheres are more difficultly dispersed, marks 3–4.

I claim:

1. A method for producing expandable thermoplastic microspheres containing a propellant by polymerization in a reaction vessel of an ethylenically unsaturated monomer or a mixture of monomers in an aqueous suspension in the presence of a propellant, comprising suspending the monomer or monomer mixture in the aqueous medium at an alkaline pH in the presence of a powder acting as a stabilizer which comprises a salt or hydroxide of Ca, Mg, Ba, Fe, Zn, Ni or Mn, and which is insoluble in the aqueous medium at the pH the aqueous medium has at the polymerization.

2. The method as claimed in claim 1, wherein the aqueous medium further comprises a co-stabilizer which comprises a compound selected from the group consisting of alkali compounds of alkyl sulphates, sulphonates, fatty acids and nonionic emulsifiers.

3. The method as claimed in claim 1, further comprising washing the powder stabilizer off the microspheres after the polymerization by lowering the pH of the aqueous medium by the addition of acid.

4. The method as claimed in claim 1, further comprising washing an amphoteric hydroxide powder stabilizer off the microspheres after the polymerization wherein the amphoteric hydroxides are dissolved by raising the pH of the aqueous medium.

5. The method as claimed in claim 1, wherein the powder stabilizer is magnesium hydroxide or calcium phosphate.

6. Expandable, propellant-containing, thermoplastic microspheres having a shell of polymerised ethylenically unsaturated monomer or monomer mixture, characterised in that the surface of the microspheres is coated with a powder stabiliser which consists of a salt or hydroxide of any of the metals Ca, Mg, Ba, Fe, Zn, Ni or Mn.

7. Thermoplastic microspheres as claimed in claim 6, characterised in that the powder stabiliser is removed by dissolving it with an aqueous medium whose pH has been lowered by the addition of acid to a value at which the powder stabiliser is dissolved, thus providing microspheres having a clean polymer surface.

8. Thermoplastic microspheres as claimed in claim 6, characterised in that the powder stabiliser is removed by dissolving it with an aqueous medium whose pH has been raised to a value at which the powder stabiliser is dissolved, thus providing microspheres having a clean polymer surface.

9. Thermoplastic microspheres as claimed in claim 6, characterised in that the powder stabiliser consists of magnesium hydroxide or calcium phosphate.

10. The use of microspheres as claimed in claim 6, as filler in polymers, paints, putty, plastisols, printing inks, paper, paperboard, explosives, cable insulations, and for impregnating nonwoven.

* * * * *